G. R. EVANS.
Amalgamator and Concentrator.
No. 216,564. Patented June 17, 1879.
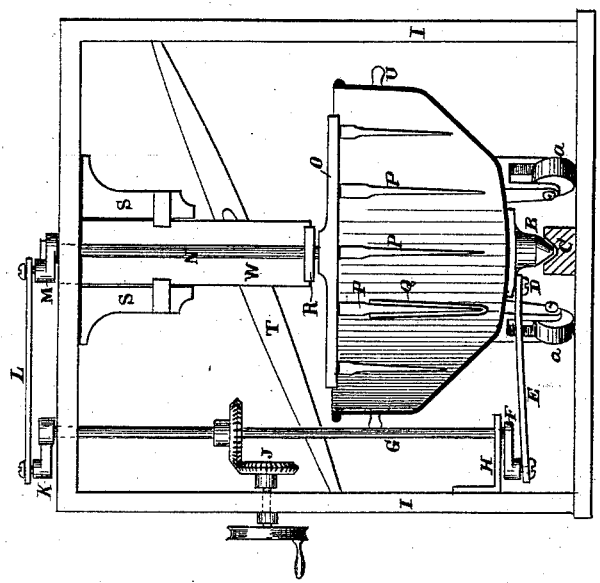
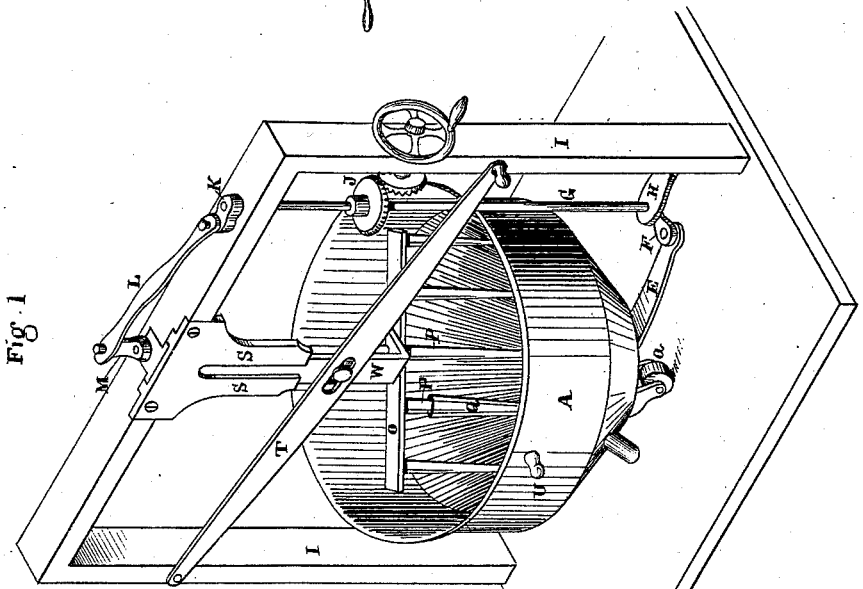
Witnesses
Geo. H. Strong
Frank A. Brooks
Inventor
George R. Evans
By Dewey & Co.
Att'ys

UNITED STATES PATENT OFFICE.

GEORGE R. EVANS, OF SAN FRANCISCO, CALIFORNIA, ASSIGNOR TO GARRETT H. HOPPER AND JOSEPH HUTCHINSON, OF SAME PLACE, ONE-THIRD TO EACH.

IMPROVEMENT IN AMALGAMATORS AND CONCENTRATORS.

Specification forming part of Letters Patent No. 216,564, dated June 17, 1879; application filed March 13, 1879.

*To all whom it may concern:*

Be it known that I, GEORGE R. EVANS, of the city and county of San Francisco and State of California, have invented an Improved Amalgamator and Concentrator; and I do hereby declare the following to be a full, clear, and exact description thereof, reference being had to the accompanying drawings.

My invention relates to an apparatus for amalgamating and concentrating the precious or other metals, saving sulphurets, &c.; and it consists in a novel combination of a pan having a horizontal reversing movement with a series of arms or blades having a similar motion in opposition to that of the pan, said blades moving within the pan. These blades have each an adjustable removable sheath formed of copper or other suitable amalgamated or plated metal, and they are connected with a slide moving in a guide, and having an operating-lever, by which they may, at pleasure, be lifted out of the pan.

Referring to the accompanying drawings for a more complete explanation of my invention, Figure 1 is a view of my apparatus. Fig. 2 is a sectional elevation.

A is a pan, which is mounted upon rollers $a$, fixed beneath its bottom upon radial axles, so that it may turn or oscillate upon its center. A spindle, B, fits into a step, $c$, and acts as a guide, around which the pan can turn or oscillate. Beneath the pan is fixed a crank-pin, D, and a connecting-rod or pitman, E, extends from this crank-arm to a short crank, F, upon the lower end of a vertical shaft, G. This vertical shaft is supported by brackets or boxes H upon the frame I, and a bevel-gearing, J, connected with any suitable power, serves to revolve the shaft. This revolution of the shaft turns the crank F, and this, operating upon the longer crank-arm, D, serves to oscillate the pan.

Upon the top of the shaft G is secured another crank, K, and a pitman, L, extends from this crank to a longer crank-arm, M, above the pan. The arm M is secured to the top of a shaft, N, which extends down toward the center of the pan, as shown. A cross-bar, O, is secured to the lower end of this shaft, and this cross-bar carries a series of sharp-edged arms or blades, P, which extend nearly to the bottom of the pan.

I make my pan with partially-converging sides, so that when the blades act upon the contained mass of pulp they will tend to concentrate the more valuable portion to the bottom. These arms P have sheaths Q, of copper or other suitable metal, which are amalgamated or plated, and may be removed from the arms or blades for the purpose of taking off the accumulated amalgam when desired.

The shaft N turns in brackets or boxes R R, which project at right angles with a vertical slide, W, to which they are secured. This slide moves up and down in guides S, and when it is raised or lowered it will carry the shaft and blades with it, so as to lower the blades into the pan or lift them entirely out of it at pleasure.

A lever, T, has one end secured to the frame-timbers, and its middle is connected with the box R by a screw or bolt, the lever being slotted to allow it to move up and down, so that by lifting the outer end of the lever the slide W, shaft N, and blades P will be lifted out of the pan. By fitting the crank-arm M upon a feather on the shaft it will be seen that the shaft might be raised at any time while the blades are in motion; but in the present case the crank moves with the shaft, and the pitman must be disconnected when the blades are to be raised. The pan is provided with openings whereby to draw off the contents from any level, as desired.

The operation will then be as follows: The pan is charged with the proper amount of pulp, tailings, or with auriferous earth, if used in placer-mining, and a sufficient quantity of water is introduced. It is then set in motion, when the reverse movements of the pan and blades thoroughly separate the heavy valuable portions from the lighter earth or pulp, and allow them to settle to the bottom.

The silver-plated or amalgamated sheaths of the blades will be brought into contact with all particles of float-gold or amalgam which are too light to settle by specific gravity, and they will thus be taken up and saved. The blades can be raised and the sheaths taken off, cleaned, and replaced, after which the pan may be again charged.

The form of the lower part of my pan is as nearly as possible that of the pan used in hand-work for saving gold in placer-mining, and the movement given to it and the contrary movement of the blades produce an effect upon the heavier and more valuable particles which causes them to sink to the bottom.

This device is capable of working a low grade of pay dirt or sand at a profit, and in working silver-ores it takes the pulp directly from the pans or batteries, and enables me to dispense with the settlers. I am also enabled to dispense with blanket sluices and riffles. The fine-floured quicksilver and sulphurets, which are usually lost in settlers, are saved to a greater extent in my apparatus, as I have no overflow, and the counter action of the blades and pan tends to cause the light particles to sink to the bottom of the pan by reason of their specific gravity.

Trunnions U are secured to opposite sides of the pan, and the pan may be driven by one or both of these trunnions when used in a series, if desired.

Having thus described my invention, what I claim as new, and desire to secure by Letters Patent, is—

1. The amalgamator and concentrator pan A and the blades P, in combination with mechanism for producing a reverse movement to the pan and blades alternately in opposite directions about a vertical axis, substantially as and for the purpose herein described.

2. The blades or arms P, mounted upon the bar O, at the bottom of the shaft N, the crank-arm M, pitman L, and the pan A, with its crank arm or pin D, and pitman E, in combination with the shaft G, with its cranks F and K, whereby the pan and blades are given reverse movements by the rotation of the shaft, substantially as and for the purpose herein described.

3. The shaft N, with its bar O, and blades P, operating within the pan, as shown, in combination with the slide W, guides S, and lever T, whereby the blades may be elevated or depressed, substantially as and for the purpose herein described.

4. The removable sheaths or plates Q, in combination with the arms P of an amalgamator stirring device, for the purpose set forth.

In witness whereof I have hereunto set my hand.

GEORGE R. EVANS.

Witnesses:
GEO. H. STRONG,
FRANK A. BROOKS.